United States Patent [19]

Kawakami et al.

[11] Patent Number: 5,387,631
[45] Date of Patent: Feb. 7, 1995

[54] TREAD RUBBER COMPOSITIONS AND METHOD OF MAKING SAME

[75] Inventors: Kinya Kawakami, Kanagawa; Atsushi Kanazawa, Yokohama, both of Japan

[73] Assignee: The Yokohama Rubber Co., Ltd., Tokyo, Japan

[21] Appl. No.: 63,053

[22] Filed: May 19, 1993

Related U.S. Application Data

[63] Continuation of Ser. No. 892,497, Jun. 3, 1992, abandoned, which is a continuation of Ser. No. 770,150, Oct. 3, 1991, abandoned, which is a continuation of Ser. No. 604,987, Oct. 29, 1990, abandoned, which is a continuation of Ser. No. 470,418, Jan. 29, 1990, abandoned, which is a continuation of Ser. No. 282,864, Dec. 9, 1988, abandoned, which is a continuation of Ser. No. 130,512, Dec. 9, 1987, abandoned.

[30] Foreign Application Priority Data

Dec. 12, 1986 [JP] Japan ................ 61-295007

[51] Int. Cl.$^6$ ........................... C08K 5/32
[52] U.S. Cl. ................... 524/260; 525/185; 525/186; 525/190; 525/203; 525/204; 525/205; 525/206; 525/210; 525/216; 525/218; 525/234; 525/237; 525/377
[58] Field of Search ........... 524/260; 525/377, 185, 525/186, 190, 203, 204, 205, 206, 210, 216, 218, 234, 237

[56] References Cited

U.S. PATENT DOCUMENTS 3,151,161 9/1964 Mullins .................. 525/377
3,756,969 9/1973 Danielson ............... 525/377

FOREIGN PATENT DOCUMENTS 0253365 1/1988 European Pat. Off. ........ 525/377

*Primary Examiner*—Peter D. Mulcahy
*Attorney, Agent, or Firm*—Finnegan, Henderson, Farabow, Garrett & Dunner

[57] ABSTRACT

Rubber compositions for use in pneumatic tire treads. Specified amounts of NR and/or IR and SBR are combined with a selected class of rubber components of the formula

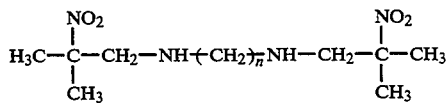

SBR contains in its molecular chains one or more atomic groups of the formula

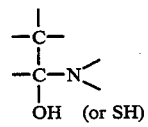

Rebound resilience, skid resistance and fuel saving are greatly improved.

7 Claims, 1 Drawing Sheet

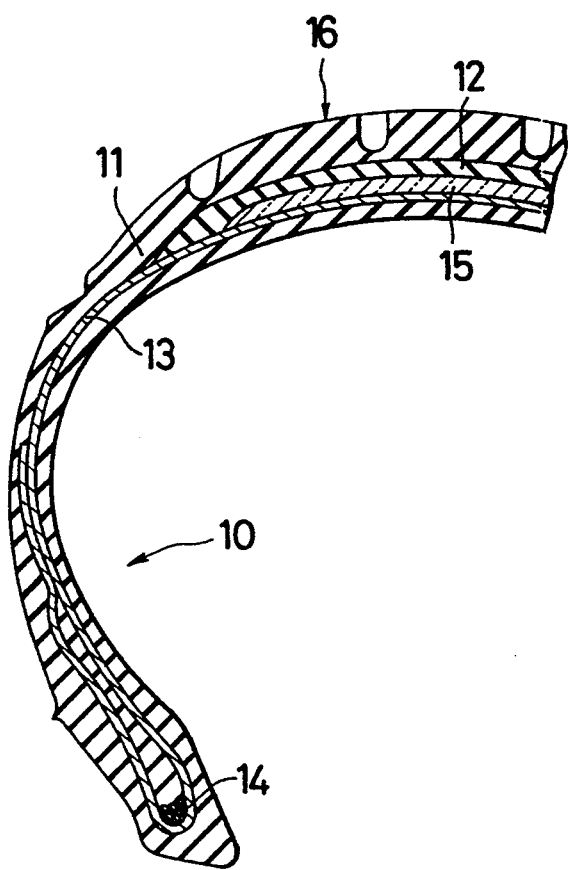

TREAD RUBBER COMPOSITIONS AND METHOD OF MAKING SAME

This application is a continuation of application Ser. No. 07/892,497, filed Jun. 3, 1992 now abandoned which is a continuation of application Ser. No. 07/770,150, filed Oct. 3, 1991 now abandoned which is a continuation of application Ser. No. 07/604,987, filed Oct. 29, 1990 now abandoned which is a continuation of No. 07/470,418, filed Jan. 29, 1990 now abandoned which is a continuation of application Ser. No. 07/282,864, filed Dec. 9, 1988 now abandoned which is a continuation of application Ser. No. 07/130,512, filed Dec. 9, 1987 now abandoned.

BACKGROUND OF THE INVENTION

Field of the Invention

This invention relates to rubber compositions suitable for use in automotive tires and also to a method of producing such compositions.

Prior Art

To cope with the trend of resource and energy saving, automobile tire manufacturers have made their great efforts to develop highly hysteresis-resistant, fuel-saving tires.

Tires are susceptible to hysteresis loss mostly at their treads. Hysteresis-resistant rubbers are known for use in tire treads, and they include natural rubber, polyisoprene rubber and butadiene rubber for their small hysteresis losses, styrene/butadiene rubber for its low glass transition temperature, and their combinations. Common additives are carbon blacks of a relatively large particle size and softening agents but in limited amounts.

These hysteresis-resistant rubbers are known vulnerable to skid on wet roads or pavements and hence unsatisfactory from the safety point of view. The use of large carbon black particles is economical of fuel but less resistant to wet skid and abrasive wear. Less softeners would make the resulting tire too rigid and skiddy on ice and snow.

SUMMARY OF THE INVENTION

It has now been found that rubber compositions of superior tread characteristics can be obtained by the use of a selected class of modified styrene/butadiene rubbers and rubber components combined with natural rubber and polyisoprene rubber.

It is an object of the invention to provide a new rubber composition for use in tire treads and a method of making the same which is highly rebound-resilient, skid-resistant and fuel-saying and has other improved qualities to ensure efficient and safe driving in cold weather.

According to one aspect of the invention, there is provided a rubber composition for use in tire treads which comprises (a) 20–80 parts by weight of natural rubber and/or polyisoprene rubber, (b) 20–80 parts by weight of styrene/butadiene rubber having a styrene bond of 10–30 percent by weight and a butadiene 1,2-vinyl bond of 30–80 percent by weight, the total amount of rubbers (a) and (b) being 100 parts by weight, the styrene/butadiene rubber containing in the polymer chain at least one atomic group of the formula

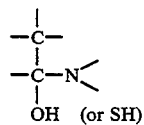

and (c) a rubber component of the formula

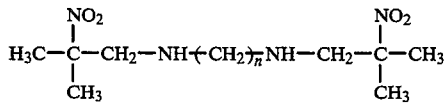

where n is an integer of 3–10.

According to another aspect of the invention, there is provided a method of producing a rubber composition for use in tire treads which comprises the steps of (a) blending 20–80 parts by weight of natural rubber and/or polyisoprene rubber with a portion of a carbon black and a rubber component of the formula

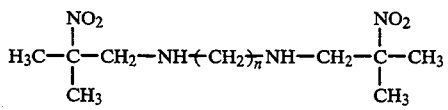

where n is an integer of 3–10, and (b) subsequently combining the blend with 20–80 parts by weight of styrene/butadiene rubber and the remaining portion of the carbon black, the total amount of rubbers (a) and (b) being 100 parts by weight, the styrene/butadiene rubber having a styrene bond of 10–30 percent by weight and a butadiene 1,2-vinyl bond of 30–80 percent by weight and containing in the polymer chain at least one atomic group of the formula

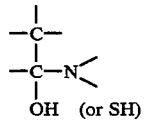

BRIEF DESCRIPTION OF THE DRAWING

The accompanying drawing shows a fragmentary cross-sectional view of a pneumatic tire having a tread provided in accordance with the invention.

DETAILED DESCRIPTION OF THE INVENTION

Referring to the drawing, there is shown a pneumatic tire 10 comprising an outer rubbery layer 11, an inner rubbery layer 12, a carcass cord 13 extending in the inner layer 12 and folded around a pair of bead wires 14, and a belt 15 superposed peripherally over the carcass cord 13. Designated at 16 is a ribbed tread formed of a rubber composition according to the invention.

The rubber composition of the invention essentially comprises natural rubber (NR) and/or polyisoprene rubber (IR), styrene/butadiene rubber (SBR) and a rubber component of formula (I):

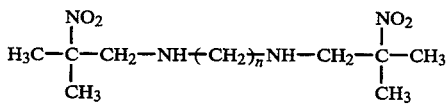

where n is an integer of 3–10.

The amount of each of the two rubbers used in the invention should be in the range of 20–80 parts by weight, totalling at 100 parts by weight. Departures from this range would lead to increased fuel consumption, wet, or icy and snowy skid. Some diene rubbers may also be incorporated in amounts smaller than 30 parts, which rubbers include for example butadiene rubber, acrylonitrile/butadiene rubber, unmodified styrene/butadiene rubber and the like.

SBR eligible for the purpose of the invention is a rubber having its molecular chains bonded at selected positions with atomic groups of formula (II):

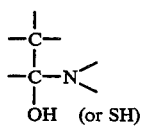

This molecular bonding may be effected by reacting unmodified styrene/butadiene copolymers with compounds containing a chemical bond of formula (III):

where M is an oxygen or sulfur atom.

Typical examples of the compounds hereinafter referred to simply as "coreactants" include N,N-dimethyl-formaldehyde, N,N-diethylformaldehyde, N,N-diethylacetamide, aminoacetamide, N,N-dimethyl-N',N'-dimethylaminoacetamide, N-phenyldiacetamide, N,N-dimethylacrylamide, N,N-dimethylmethacrylamide, propionamide, N,N-dimethylpropionamide, 4-pyridylamide, N,N-dimethyl-4-pyridylamide, N,N-dimethylbenzamide, p-aminobenzamide, N',N'-(p-dimethylamino)-benzamide, N,N-dimethyl-N'-(p-ethylamino)benzamide, N-acetyl-N-2-naphthylbenzamide, nicotinamide, N,N-diethylnicotinamide, amide succinate, amide maleate, N,N,N',N'-tetramethylamide maleate, imide succinate, maleimide, N-methylmaleimide, N-methylphthalimide, 1,2-cyclohexanecarboxylimide, N-methyl-1,2-cyclohexane-dicarboxylimide, oxamide, 2-furlamide, N,N,N',N'-tetramethyloxamide, N,N-dimethyl-2-furlamide, N,N-dimethyl-8-quinolinecarboxylamide, N,N-dimethyl-p-aminobenzylacetamide, N,N-dimethyl-N',N'-(p'-dimethylamino)-cinnamylideneacetamide, N,N-dimethyl-N',N'-(2-dimethylamino)-vinylamide, N'-(2-methylamino)vinylamide, urea, N,N'-dimethylurea, N,N,N',N'-tetramethylurea, methyl carbamate, N,N-diethylmethyl carbamate, ε-caprolactum, N-methyl-ε-caprolactum, 2-pyrrolidone, N-methyl-2-pyrrolidone, N-acetyl-2-pyrrolidone, 2-piperidone, N-methyl-2-piperidone, 2-quinoline, N-methyl-2-quinoline, 2-indolinone, N-methyl-2-indolinone, isocyanuric acid, N,N',N''-trimethylisocyanurate and the like, and their sulfur-containing compounds. Particularly preferred are coreactants having an alkyl group attached to the nitrogen atom.

Styrene/butadiene copolymer-coreactant reactions may be a polymerization in which styrene and butadiene are reacted with use of an alkaline metal or earth metal catalyst, followed by addition of a coreactant to the reaction solution, or a polymerization in which styrene and butadiene are reacted with a coreactant in a suitable organic solvent and in the presence of a similar catalyst. Any commonly known solution-polymerization catalysts may suitably be used for such reactions. Alkaline metal catalysts include for example metals such as lithium, rubidium, cesium and the like, and their complexes with hydrocarbon or polar compounds, such as n-butyllithium, 2-naphthyllithium, potassium-tetrahydrofuran, potassium-diethoxyethane and the like. Alkaline earth metal catalysts may be those predominantly of barium, strontium, calcium and the like as disclosed for instance in Japanese Patent Laid-Open Publication Nos. 51-115590, 52-9090 and 57-100146.

On completion of the reaction, the resulting unsaturated rubber-like polymer may be coagulated for example with methanol and separated from the reaction solution as by steam stripping, thereby providing a modified SBR rubber.

Importantly, SBR used herein should have at least one atomic group of formula (II) chemically bonded at a selected position of the molecular chain. Bonding at the terminal chain is particularly preferred as fuel saving has now been found attributable primarily to the use of SBR resulting from reaction of a dienyl-terminated styrene/butadiene copolymer with a coreactant. SBR so modified is highly rebound-resilient compared to unmodified SBR and hence skid-resistant and fuel-saving with other important qualities maintained on an optimum level.

SBR should have a styrene bond in the range of 10–30% by weight and a butadiene 1,2-vinyl bond in the range of 30–80% by weight. Smaller styrene bonds than 10% would fail to give sufficient wet-skid resistance, whereas larger styrene bonds than 30% would improve this quality but not to an extent to preclude icy and snowy skid and abrasion. Styrene/butadiene copolymers of smaller 1,2-vinyl bonds than 30% are difficult to make and if not, would be susceptible to skid on ice and snow. Larger 1,2-vinyl bonds than 80% would develop intense heat buildup, leading to reduced resistance to icy and snowy skid and to abrasive wear.

To facilitate fabrication of the rubber composition of the invention, SBR may contain a tin-butadienyl branched polymer. However, excess branched polymer should be avoided to preclude insufficient bonding of atomic groups of formula (II) at the terminal chain of SBR. The ratio of branched polymer should preferably be between 0.1 and 4.0 in terms of styrene/butadiene copolymer containing at least one atomic group.

Eligible rubber components of formula (I) typically include N,N'-bis(2-nitro-2-methylpropyl)-1,6-diaminohexane. There is no particular restriction imposed on the amount of this component which may however be feasible in the range of 0.1–3.0 parts by weight per 100 parts of NR and/or IR and SBR. Component (I) is liquid at room temperature and may for easy handling be deposited on an inorganic material such as silica, clay, calcium carbonate or the like.

Various other additives may be employed which include vulcanizing agents, vulcanizing aids, accelerators, antioxidants, softeners and the like.

The method of producing the rubber compositions according to the invention should preferably be effected by a two-stage mode of blending. In the first stage, NR and/or IR are admixed with a portion of a carbon black and a rubber component. The second stage involves combining the admixture with SBR and the remaining portion of the carbon black.

More specifically, NR and/or IR are added with a rubber component of formula (I) and a carbon black in an amount of 5-100 parts, preferably 30-60 parts, the amount being equivalent to 2-80% of the total carbon black, whereby a master batch is provided. After being adjusted in its NR and/or IR content to 20-80 parts, the master batch receives 20-80 parts of SBR and the balance of the carbon black and if necessary together with other additives.

Component (I) has an important roll in admixing an NR or IR/carbon black system so as to provide a compatibly homogeneous blend, contributing to enhanced rebound resilience. Component (I) is believed inactive for an SBR/carbon black system. NR and/or IR and SBR when simultaneously combined with component (I) would result in reduced rebound. Excessive amounts of component (I) would induce premature scorching during vulcanization, resulting in a vulcanizate of inadequate hardness and modulus.

Eligible carbon blacks may range in grade from high abrasion (HAF) to intermediate super abrasion (ISAF) but should have a specific surface area in the range of 60-140 m$^2$/g, preferably 75-120 m$^2$/g, as determined by nitrogen adsorption and an oil absorption in the range of 100-150 ml/100 g, preferably 110-140 ml/100 g, as determined on dibutyl phthalate. Carbon blacks of surface areas smaller than 60 m$^2$/g, though acceptably fuel-saving, would be extremely wet-skiddy and abrasive, whereas those larger than 140 m$^2$/g would be fuel-consuming. Smaller oil absorptions than 100 ml/100 g would invite insufficient abrasion resistance. Larger oil absorptions than 150 ml/100 g would make the tire tread readily rigid at low temperature and skiddy on ice and snow. The carbon blacks should also preferably have a half-value width ($\Delta$ Dst) in the range of 85-130 m$\mu$ as determined from the agglomeration distribution by centrifugal precipitation.

The following examples are given to further illustrate the invention.

Numerous rubber compositions were prepared and examined for rebound resilience, elongation and rolling resistance. Details as regards the recipes and results were shown in Tables 1-4.

Tests were made with use of SBR rubbers and according to the procedures given below.

| Bond | Test SBR Rubbers | |
|---|---|---|
|  | SBR-1 | SBR-2 |
| styrene (%) | 22 | 20 |
| butadiene 1,2-vinyl (%) | 34 | 60 |

*) both rubbers having an atomic group bonded to the polymer chains

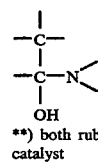

**) both rubbers derived from solution polymerization using an organic lithium catalyst

TEST PROCEDURES

Rebound Resilience Test

JIS K-6301 was followed. Vulcanization was effected at 160° C. for 15 minutes. Resilience was determined according to section 11 of this standard.

Elongation Test

Measurement was made in accordance with JIS K-6301. Vulcanization was effected under conditions similar to the above. Elongation was determined prior to and after aging at 100° C. for 48 hours.

Rolling Resistance Test

A test tire was allowed to run on an indoor test drum of 707 mm diameter under conditions of tire inner pressure: 1.9 kg/cm$^2$, load: 385 kg, speed: 100 kg/hr and time: 30 min. Resistance was measured at 60 kin/hr.

EXAMPLE 1 AND COMPARATIVE EXAMPLES 1-3

The larger amount of vulcanizing agent or accelerator, the greater the rebound resilience as was apparent from Table 1, Comparative Examples 1-3 which however showed a sharp decline in after-aging elongation and hence inadequate durability. The use of rubber component of formula (I), Example 1, is highly satisfactory in respect of both resilience and elongation.

EXAMPLES 2-4 AND COMPARATIVE EXAMPLES 4-10

Kneading was effected under conditions of kneader: Banbury B-type mixer, rotor: 60 rpm, filling: 70%, temperature: 80° C., 0': rubber charge, 1': powder and oil charge (except for vulcanizing system), 2.5': ram up-and-down movement and 4': discharge, followed by separate kneading of the vulcanizing system on open roll.

As appears clear from Table 2, the use of rubber component is effective for improving rebound resilience. This quality is pronounced in Example 4 which involves the use of rubber component combined with peptizer.

EXAMPLES 5-9

Rubbers, rubber components (I) and other additives were kneaded as shown in Table 3-1, followed by cooling to room temperature, thereby providing master batches. Subsequently, the master batches were formulated and further kneaded as shown in Table 3-2.

First stage kneading was effected under the same conditions as in Table 2 except that the vulcanizing system was omitted. Second stage kneading was effected under conditions of 0': NP and rubber charge, 0.5': powder and oil charge, 2': ram up-and-down movement and 3.5': discharge, followed by separate kneading of the vulcanizing system on open roll.

Two-stage blending proved effective for improving rebound resilience as demonstrated in Table 3-2.

EXAMPLE 5 AND COMPARATIVE EXAMPLE 10

Two tires were produced which were constructed as per the accompanying drawing and dimensioned to a 155 SR 13 size. The treads were fabricated respectively from Example 5 and Comparative Example 10.

Rolling resistance, as was clear from Table 4, was adjudged with the comparative tire taken as a control index of 100. The smaller index, the greater rolling resistance and fuel saving.

Having thus described the invention, it will be apparent to those skilled in the art that many changes and modifications may be made to the invention without departing from the scope of the appended claims.

TABLE 1

| Formulations | Comparative Examples | | | Example 1 |
|---|---|---|---|---|
| | 1 | 2 | 3 | |
| NR | 50 | 50 | 50 | 50 |
| SBR-1 | 50 | 50 | 50 | 50 |
| carbon black | 50 | 50 | 50 | 50 |
| zinc white | 3 | 3 | 3 | 3 |
| stearic acid | 2 | 2 | 2 | 2 |
| antioxidant | 1.5 | 1.5 | 1.5 | 1.5 |
| wax | 1.0 | 1.0 | 1.0 | 1.0 |
| oil | 5 | 5 | 5 | 5 |
| sulfur | 1.75 | 2.35 | 1.75 | 1.75 |
| accelerator | 1.0 | 1.0 | 1.2 | 1.0 |
| rubber component*) | | | | 0.5 |
| Properties | | | | |
| rebound resilience | | | | |
| 60° C. | 63 | 65 | 63 | 65 |
| 0° C. | 35 | 37 | 35 | 35 |
| elongation | | | | |
| B1 | 500 | 420 | 440 | 480 |
| 100° C. × 48 hr | 350 | 200 | 220 | 350 |
| aged (retention) | (70%) | (48%) | (50%) | (73%) |

*)N,N'-bis(2-nitro-2-methypropyl)-1,6-diaminohexane, formula (I), n = 6

TABLE 2

| Formulations | Comparative Examples | | | | | | Examples | | | Comparative Example 10 |
|---|---|---|---|---|---|---|---|---|---|---|
| | 4 | 5 | 6 | 7 | 8 | 9 | 2 | 3 | 4 | |
| NR | 100 | | 100 | | 50 | 50 | 50 | 50 | 50 | 50 |
| SBR-1 | | 100 | | 100 | 50 | | 50 | | 50 | 50 |
| SBR-2 | | | | | | 50 | | 50 | | |
| peptizer[1] | | | | | | | | | 0.2 | 0.2 |
| carbon black (N339) | 50 | 50 | 50 | 50 | 50 | 50 | 50 | 50 | 50 | 50 |
| zinc white | 3 | 3 | 3 | 3 | 3 | 3 | 3 | 3 | 3 | 3 |
| stearic acid | 2 | 2 | 2 | 2 | 2 | 2 | 2 | 2 | 2 | 2 |
| antioxidant[2] | 1.5 | 1.5 | 1.5 | 1.5 | 1.5 | 1.5 | 1.5 | 1.5 | 1.5 | 1.5 |
| wax | 1.0 | 1.0 | 1.0 | 1.0 | 1.0 | 1.0 | 1.0 | 1.0 | 1.0 | 1.0 |
| rubber component[3] | | | 1.5 | 1.5 | | | 1.5 | 1.5 | 1.5 | |
| oil (aromatic) | 5 | 5 | 5 | 5 | 5 | 5 | 5 | 5 | 5 | 5 |
| sulfur | 1.75 | 1.75 | 1.75 | 1.75 | 1.75 | 1.75 | 1.75 | 1.75 | 1.75 | 1.75 |
| accelerator (NS)[4] | 1.0 | 1.0 | 1.0 | 1.0 | 1.0 | 1.0 | 1.0 | 1.0 | 1.0 | 1.0 |
| Properties | | | | | | | | | | |
| rebound resilience | | | | | | | | | | |
| 60° C. | 62 | 62 | 66 | 62 | 63 | 65 | 65 | 67 | 66 | 63 |
| 0° C. | 37 | 33 | 41 | 33 | 35 | 23 | 35 | 23 | 35 | 35 |

Notes:
[1]mixture of zinc-2-benzamide thiophenate and metal chelate compound (metal, transition metal, Fe, Co, Ni etc.)
[2]tradenamed Santoflex 13 N-phenyl-N'-1,3-dimethylbutyl-p-phenylenediamine
[3]same as footnoted to Table 1
[4]tradenamed Nocceller NS t-butylaminobenzothiazolyl sulfenamide

TABLE 3-1

| NP No. | 1 | 2 | 3 | 4 | 5 |
|---|---|---|---|---|---|
| NR | 50 | | 50 | 75 | 25 |
| SBR-1 | | 50 | | | |
| peptizer | | | 0.2 | 0.2 | 0.1 |
| carbon black (N339) | 25 | 25 | 25 | 37.5 | 12.5 |
| zinc white | | 3 | | | |
| stearic acid | | 2 | | | |
| antioxidant | | 1.5 | | | |
| wax | | 1.0 | | | |
| rubber component* | 0.5 | | 0.5 | 0.5 | 0.5 |
| oil | | 5 | | | |

*)same as footnote to Table 1

TABLE 3-2

| Examples | 5 | 6 | 7 | | 8 | 9 |
|---|---|---|---|---|---|---|
| NP No. | 1 | 3 | 3 | 2 | 4 | 5 |
| (Table 3-1) phr | 76.5 | 76.7 | 76.7 | 87.5 | 114.2 | 39.1 |
| SBR-1 | 50 | 50 | NP-NP blended | | | 75 |
| SBR-2 | | | | | 25 | |
| carbon black (N339) | 25 | 25 | | | 12.5 | 37.5 |
| zinc white | 3 | 3 | | | 3 | 3 |
| stearic acid | 2 | 2 | | | 2 | 2 |
| antioxidant | 1.5 | 1.5 | | | 1.5 | 1.5 |
| wax | 1 | 1 | | | 1 | 1 |
| Oil | 5 | 5 | | | 5 | 5 |
| sulfur | 1.75 | 1.75 | 1.75 | | 1.75 | 1.75 |
| accelerator (NS) | 1.0 | 1.0 | 1.0 | | 1.0 | 1.0 |
| Properties | | | | | | |
| rebound resilience | | | | | | |
| 60° C. | 67 | 68 | 68 | | 69 | 66 |
| 0° C. | 35 | 35 | 35 | | 23 | 34 |

TABLE 4

| Tread Rubbers | Comparative Example 10 | Example 4 |
|---|---|---|
| rolling resistance | 100 | 97 |

What is claimed is:

1. A rubber composition for tire treads which comprises:
    (a) from 20 to 80 parts by weight of a rubber selected from the group consisting of natural rubber, polyisoprene rubber and mixtures thereof;
    (b) from 80 to 20 parts by weight of a styrene/butadiene copolymer rubber having a styrene content of 10 to 30 percent by weight and a 1,2-vinyl bond content of 30 to 80 percent by weight, said styrene/butadiene copolymer rubber being a rubber resulting from the reaction of an unmodified styrene/butadiene copolymer rubber with a compound selected from the group consisting of N,N-dimethylformaldehyde, N,N-diethylformaldehyde, N-diethylacetamide, aminoacetamide, N,N-dimethyl-N',N'-dimethylaminoacetamide, N-phenyldiacetamide, N,N-dimethyl-acrylamide, N,N-dimethylmethacrylamide, propionamide, N,N-dimethylpropionamide, 4-pyridylamide, N,N-dimethyl-4-pyridylamide, N,N-dimethylbenzamide, p- aminobenzamide, N',N'-(p-dimethylamino)benzamide, N,N-dimethyl-N'-(p-ethylamino)benzamide, N-acetyl-N-2-naphthylbenzamide, nicotinamide, N,N-diethylnicotinamide, amide succinate, amide maleate, N,N,N',N'-tetramethylamide maleate, imide succinate, maleimide, N-methylmaleimide, N-methylphthalimide, 1,2-cyclohexanecarboxylimide, N-methyl-1, 2-cyclohexane-dicarboxylimide, oxamide, 2-furlamide, N,N,N',N'-tetramethyloxamide, N,N-dimethyl-2-furlamide, N,N-dimethyl-8-quinolinecarboxylamide, N,N-dimethyl-p-aminobenzylacetamide, N,N-dimethyl -N',N'-(p'-dimethylamino)-cinnamylideneacetamide, N,N-dimethyl-N',N'-(2-dimethylamino)-vinylamide, N'-(2-methylamino)-vinylamide, urea, N,N'-dimethylurea, N,N,N',N'-tetramethylurea, methyl carbamade, N,N-diethylmethyl carbamate, ε-caprolactum, N-methyl-ε-caprolactum, 2-pyrrolidone, N-methyl-2-pyrrolidone, N-acetyl-2-pyrrolidone, 2-piperidone, N-methyl-2-piperidone, 2-quinoline, n-methyl-2-quinoline, 2-indolinone, N-methyl-2-indolinone, isocyanuric acid and N,N',N''-trimethylisocyanurate and having at the terminal end of the polymer chain an atomic group of the formula

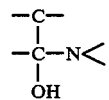

the total amount of said rubbers (a) and (b) in the composition being 100 parts by weight, and (c) an effective amount of a rubber component of the formula

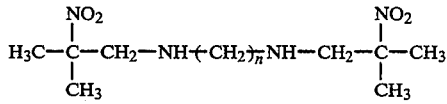

where n is an integer of 3–10.

2. The rubber composition of claim 1, wherein said rubber component (c) is present in an amount of from 0.1 to 3.0 parts per 100 parts of rubbers (a) and (b).

3. The rubber composition of claim 2, wherein said styrene/butadiene copolymer rubber (b) further includes a tin-butadienyl branched polymer.

4. The rubber composition of claim 2, wherein said rubber component (c) is N,N'-bis(2-nitro-2-methylpropyl)-1,6-diaminohexane.

5. The rubber composition of claim 2, wherein said compound reacted with the unmodified styrene/butadiene copolymer rubber is ε-caprolactum.

6. The rubber composition of claim 3, wherein said compound reacted with the unmodified styrene/butadiene copolymer rubber is ε-caprolactum.

7. The rubber composition of claim 4, wherein said compound reacted with the unmodified styrene/butadiene copolymer rubber is ε-caprolactum.

* * * * *